June 7, 1955  E. R. POWELL  2,710,107
FLOATING HOIST

Filed Aug. 4, 1954  2 Sheets-Sheet 1

INVENTOR.
EDGAR R. POWELL
BY Louis Chaujka
ATTORNEY.

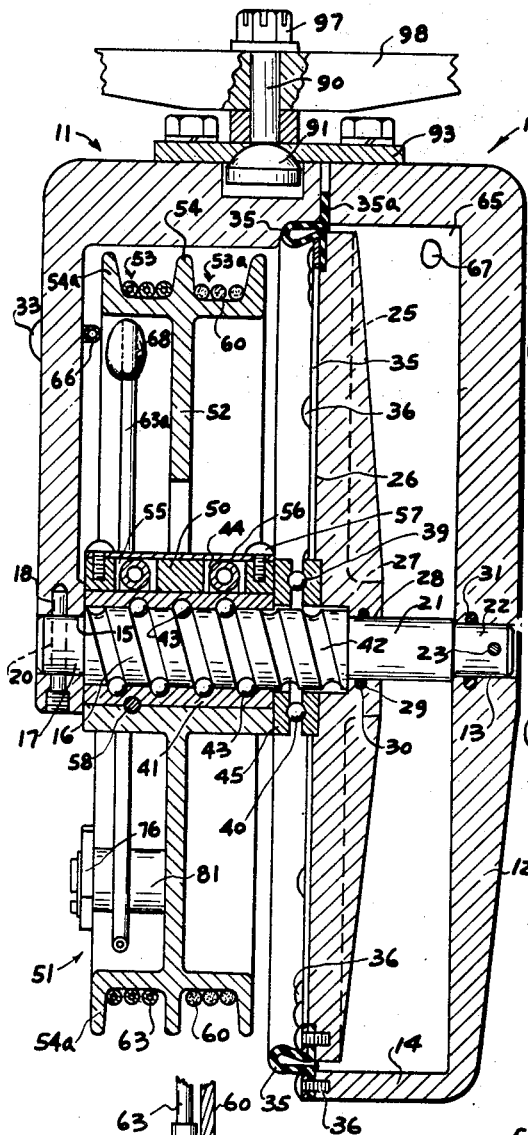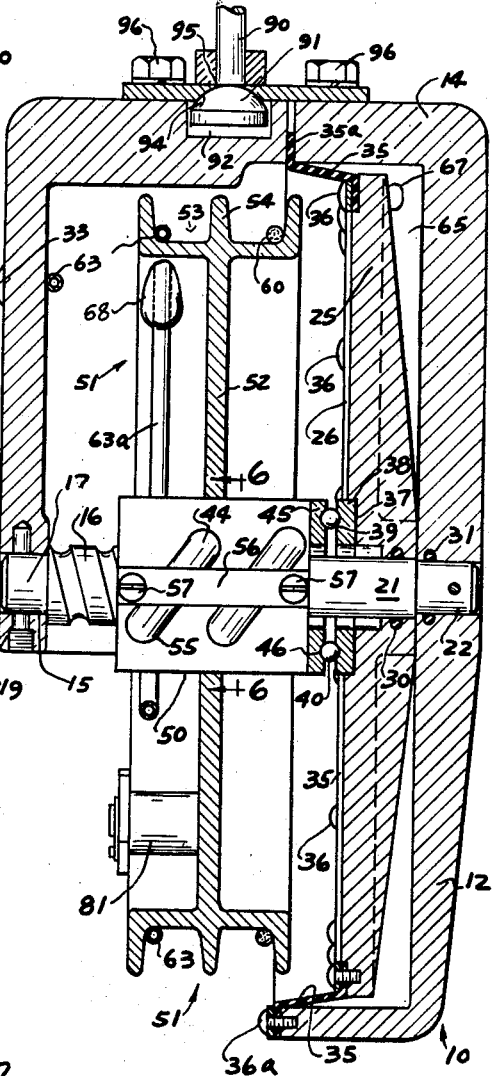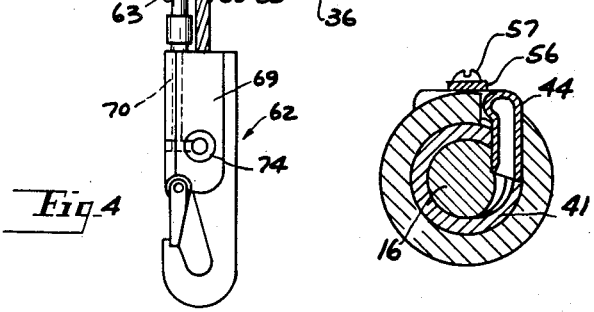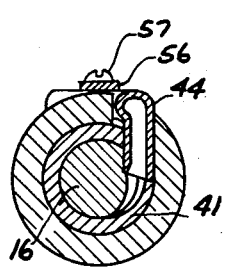

United States Patent Office 2,710,107
Patented June 7, 1955

2,710,107

FLOATING HOIST

Edgar R. Powell, Detroit, Mich.

Application August 4, 1954, Serial No. 447,836

5 Claims. (Cl. 214—658)

The invention pertains to a hoist designed for use in shops, magazines, factories, and other places where heavy loads are to be raised for loading or for moving them from one location to another. The hoist is of a type in which a fluid medium, such as air under pressure, is employed to balance, selectively, either the weight of the load-lifting members alone or said weight and the weight of the object to be raised thereby, so that the object may be raised with a minimum of manual effort.

In order to attain the objectives of this invention, I have devised a novel combination of elements, including a stationary ball screw, a rotary nut mounted thereon and associated with a reel for the load-sustaining cable. The combination includes, further, diaphragm means actuated by fluid pressure to balance the pull of the load upon the cable on the reel, thus making it possible to float the load at a desired level.

A still further object of the invention is to provide a hoist capable of the functions specified above but one which will be compact, relatively light, and yet fully practical for the purposes for which it has been designed.

I shall now describe my invention with reference to the accompanying drawings in which:

Fig. 2 is a sectional view on line 2—2 of Fig. 1;

Fig. 3 is the same sectional view of the hoist, the view disclosing operative elements thereof in positions different from those shown in Fig. 2;

Fig. 4 is a side elevational view of a load-supporting hook as suspended from the cable extending downwardly from the hoist;

Fig. 6 is a sectional view on line 6—6 of Fig. 3.

Similar numerals refer to similar parts throughout the several views.

Figures 1, 5:
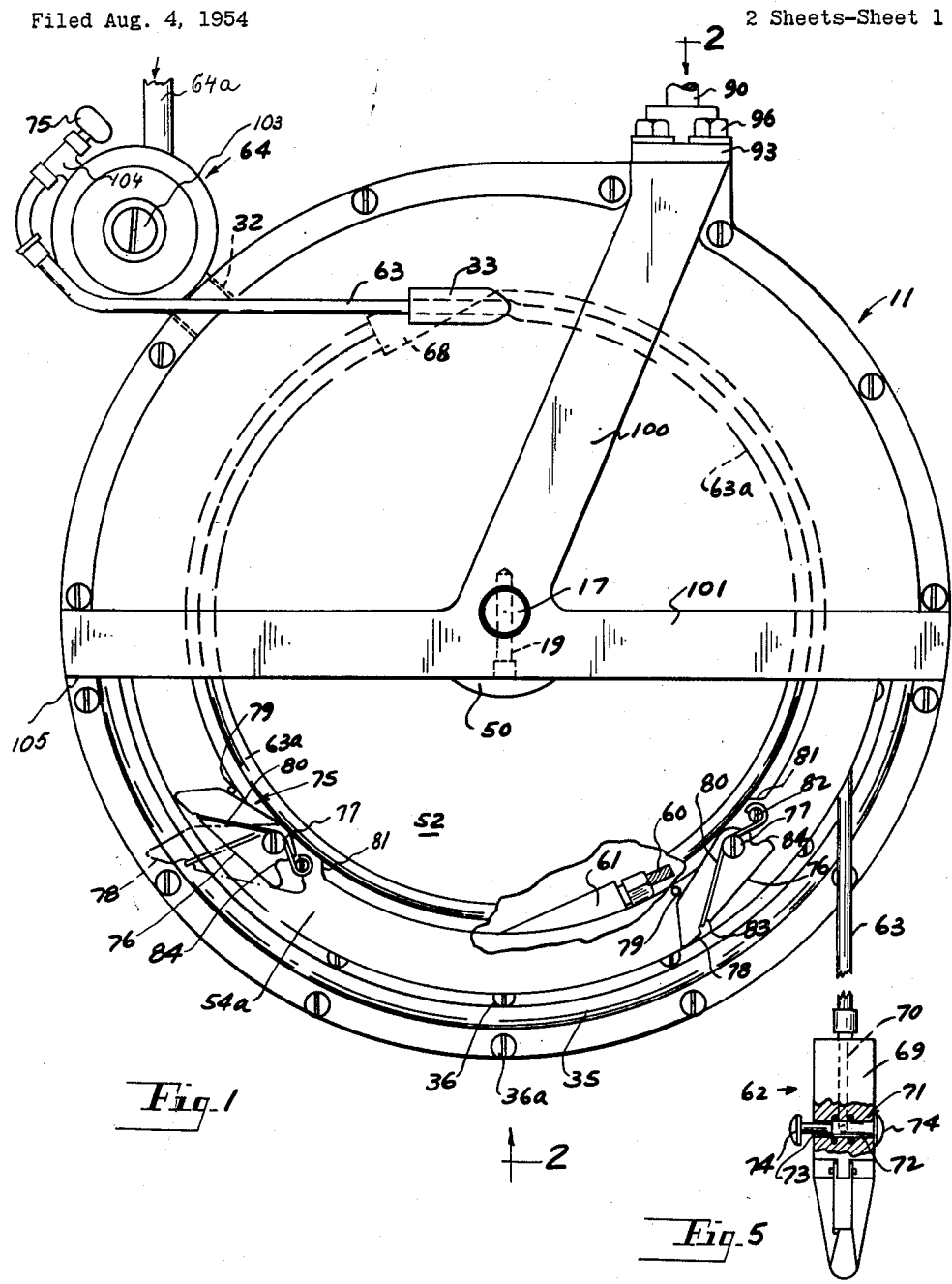
Fig. 1 is a side elevational view of the hoist.
Fig. 5 is a front view of the hook with parts broken off for disclosure of elements contained therein.

The hoist includes a cast metal housing composed of two principal parts, a drum-like casing, generally identified by numeral 10, and a cover, generally identified by numeral 11. The cover is semi-circular in shape, but drawn to the same diameter as the casing 10, the casing and the cover being joined along their respective peripheral portions.

The casing includes a circular end wall 12 provided with an axial opening 13 and a circular wall 14 extending at right angle from said end wall which is disposed in a vertical plane. The cover 11 is also provided with an aperture 15 alined with the aperture 13 in the end wall 12 of the drum-like casing 10.

The apertures serve as a means of supporting therein the end portions of a ball screw 16 one end of which, forming a stub 17 of a reduced diameter, fits into said aperture 15. A pin 18, projecting from below through an opening 19 in the body of the cover, passes through a diametrical bore 20 in the stub 17 and serves to prevent the rotation of the screw about its axis.

At the opposite end the screw includes a smooth shank 21 terminating with a stub 22 of a reduced diameter, the stub fitting into said aperture 13 and being secured therein against rotation by means of a pin 23.

Normally disposed within the casing 10 is a disk-like diaphragm 25 having a flat face on the side of the cover 11 and including, on the opposite side, a centrally-located boss 27 provided with an axial aperture 28 for engagement with the shank 21 of the ball screw 16, upon which shank the diaphragm is mounted for a longitudinal sliding movement thereon. The flat face is marked 26.

To make the contact of the shank with the inner surface of the aperture 28 leakproof, a sealing member 29 is used in an annular groove 30. A similar seal 31 is used in conjunction with the stub 22, as shown in Fig. 2, to prevent leakage along the surface thereof.

Affixed to the peripheral portion of the diaphragm is a webbing 35, made of a flexible water and air-tight material, such as sheet rubber or neoprene. The webbing, which extends all about the periphery of the diaphragm, is made in the form of a band and is secured along one side thereof to the diaphragm, as stated above, by means of bolts 36, as best shown in Figs. 2 and 3.

The opposite edge of the band is connected to the rim of the circular wall 14 of the casing 10 below the lower limits of the cover 11 by bolts 36a. Along the semi-circle above the lower limit of the cover, the respective edge of the band is clamped between the rim of the casing and the rim of the cover 11, as shown at 35a in Fig. 2.

Located on the flat-faced side 26 of the diaphragm, in an axial recess 37 about the shank 21 of the ball screw 16, is an annular plate 38 forming a part of a thrust bearing including a plurality of balls 40 and a complementary annular plate 45 to which I shall refer in the course of this specification. Both plates are provided in the faces opposed to each other with races or grooves 39 for engagement with said balls 40.

Mounted upon the ball screw 16 is a nut 41, the nut being provided with a spiral groove 42 and a plurality of balls 43, each fitting partly into the groove 42 and partly into the spiral groove of the screw 16. The construction of this type is now well known in trade and includes outside tube means whereby balls, contained within the nut and following the spiral groove with the longitudinal progressive movement of the nut upon said screw, are returned from one end of the nut to the other end thereof. Such tubes, marked 44, are shown in Figs. 2 and 3, but are disclosed in Fig. 3 to the extent of 90 degrees out of position for a clearer presentation of the combination of parts disclosed herein.

The nut itself fits axially into a cylindrical hub 50 of a cable reel generally identified by numeral 51. The reel includes a web 52 radially extending from the hub, and carries, at its outer periphery, two integrally-formed annular troughs, marked generally 53 and 53a, the troughs being in a side by side parallel relation to each other, but being separated by an integrally-formed rib or fin 54. The outer walls of the troughs are marked 54a.

The reel 51 and the nut 41 form a unit and are both designed to rotate about the ball screw 16. It is at the end facing the diaphragm 25 that the hub 50 of the reel and the nut 41 serve as a medium for the mounting of the aforementioned annular plate 45 forming a part of the thrust bearing described above.

To conclude that part of the specification which pertains to the ball screw and the ball nut, I wish to add that the hub 50 or the reel 51 is provided with slots 55 for reception of the ball-returning tubes 44. A bar 56, applied transversely over the tubes and secured to the body of the hub by screws 57, keeps said tubes in place.

A pin 58 at the junction of the hub 50 with the ball nut 41, as shown in Fig. 3, prevents a longitudinal shift of the respective parts with relation to each other.

Coiled upon the reel and occupying one of said peripheral troughs 53a is a cable 60, the cable being anchored at one end to the peripheral portion of the reels, as shown at 61. At the opposite end the cable supports a hook, generally identified by numeral 62, the hook being adapted to be applied to a load to be raised by the hoist.

Similarly coiled within the adjoining trough 53 of the reel is a length of a flexible hose 63, at times referred to as a bleed hose. One end of the hose is connected to a pneumatic pressure regulator identified by numeral 64. The regulator is of the type well known in trade under the name of Norgren Series 20 A COO Integral Type Pilot Controlled Regulator.

The regulator, which is mounted on the housing of the hoist, includes a casing having a port through which air, under pressure from a suitable source, is supplied thereto by means of a hose 64a of which only a part is shown. From the port through a duct within said casing the air is conveyed to a pilot 104, and thence to a chamber also within said casing, the duct being controlled by a needle value disposed within said pilot and operated by an adjusting knob 75. The air enters said chamber in which one wall consists of a flexible diaphragm. The diaphragm is provided with a valve which consists of a hollow nut fitting over a stationary plug. A coiled spring holds the nut against said plug, and a screw 103, also referred to as a knob, serves to adjust the tension of the spring.

When the tension of the spring is greater than the pressure of air in the chamber within said casing, the valve is closed. When the air pressure rises beyond that of the tension of the spring, the diaphragm, with the nut, is lifted, the air passes through the nut out of the chamber and escapes through an outlet in the wall of the casing. The pilot, which is controlled by said needle valve, is connected to one end of the hose 63.

The hose leads into an oblong hood 33 located over an opening in said cover 11, enters the housing of the hoist, as shown at 66, and forms a free-hanging loop 63a about the hub 50 of the reel, then through an opening in a boss 68 in the peripheral portion of the rim passes into the trough 53. The hose is wound upon said reel in said trough 53 in the same manner as said cable 60 is coiled in its trough, the outer end of the hose leading to shank 69 of hook 62. A duct 70 in the shank leads to a valve 71 by means of which the duct may be either closed or kept open, as desired, in order that air may be discharged therethrough. The valve includes a cylindrical plug 72 in a transverse aperture 73 within said shank, and is adapted to be shifted from the open to the closed position, or vice versa, by means of push buttons 74.

The structure of the regulator, as above described, makes it possible to adjust the needle valve by means of said knob 75 so that the air coming in through the inlet port to the regulator will be released from the pilot into the hose 63 and to the valve 71 in the hook 62. When so released, the pressure in the chamber of the regulator will be lowered, as the air may be released through said valve 71 faster than it can be supplied through said duct from the source of supply. Thus, by means of said needle valve, the air pressure in the chamber of the regulator may be lowered when the valve is open or raised when the valve is closed.

Here it must be added that said regulator includes an auxiliary chamber also controlled by flexible diaphragm means wherein, by combination of valves, air is kept under pressure corresponding to the pressure in the first-named chamber. It is this auxiliary chamber which is directly connected, by means of a nipple 32, to chamber 65 in the hoist.

Pivotally mounted on the outer surface 54a of the peripheral portion of the reel are a plurality of speed-checking devices, generally identified by numeral 75. Each of them includes a flat, wedge-like member 76 at one end pivotally secured to an integrally-formed block 81 on the inner surface of the peripheral portion of the reel by a screw 77, the outer end 78 of the member extending normally up to the rim of the reel.

A pin 79 bearing against one side of the member limits its movement towards the center of the reel, the member bearing normally against said pin under the action of a spring 80. The spring is anchored at one end to a screw 82 and is secured at its opposite end within a notch 83 in said member 76. The heel portion of said member is provided with a recess 84 for engagement with the shank of said screw 82 which serves to limit the movement of the member in that direction.

The above speed-retarding device is designed to become operative in case of an excessive speed of the rotation of said reel, which event might, for example, occur in case of the failure of the diaphragm. In such a case, the outer end of said member 76 would be thrown, by centrifugal force, outwardly beyond the rim of the reel, as shown in dotted lines in Fig. 1, and would, in the course of the rotation of the reel, encounter the lower rim 105 of one end of the horizontal rib 101 of the cover 11. The encounter would serve to abruptly stop the rotation of the reel.

To complete the description of the hoist, I wish to add that for the purpose of having the hoist suspended for action, it is provided, at the top, with an upright bolt 90 terminating at the lower end with a semi-spherical bulb 91 which fits into a recess 92 in the cover 11 of the housing. A bar 93, having on its underside a substantially semi-spherical socket 94 and an axial aperture 95 therein, is secured over said bulb 91 by screws 96. The bolt is connected, by means of a nut 97, to a horizontal beam 98 which may be a part of a travelling trolley or a crane.

For the purpose of strengthening the housing of the hoist, especially at the portion where it is suspended by said bolt 90, the cover is provided with an integrally-formed radial rib 100. The latter is joined to a similar rib 101 which is disposed in a diametrical horizontal position. It is at the junction of said ribs that the cover is provided with the above-named aperture 15 for reception of one end of the ball screw 16.

In order to describe the operation of the hoist, it will be assumed that the control unit 64 of the air-supply system has been properly connected to the source of supply of compressed air, also to said chamber 65 and to the bleed hose 63. It will be further assumed that the valve 71 in the shank of the hook 62 has been closed.

Now, in order to apply the hook of the hoist to the object to be raised, it would be necessary to pull the hook down, which movement, transmitted by the cable to the reel, would cause the reel to rotate. The rotation of the reel would cause a longitudinal movement of the ball nut 41 from the position shown in Fig. 2, the nut forcing the diaphragm 25 in the direction of the end wall 12 of the housing. Such a movement of the diaphragm would be opposed by the compressed air in the chamber 65. Therefore, in order to lower the hook, the pressure in the chamber 65 would have to be reduced. This is effected remotely by means of the pilot 104, or, more specifically, by opening the valve 71 in the shank of the hook 62. A release of the air from the pilot through the hose 63 and said valve 71 will cause a shift of the respective valve means in the regulator so that the pressure in chamber 65 will be lowered to a point when it may be just sufficient to balance the weight of the cable and the hook alone and permit the lowering of said hook to the level of the object to be raised. This low pressure is regulated by means of the needle valve controlled by said adjusting knob 75.

Next, when the hook has been applied to said object, air pressure in the chamber 65 is raised till said pressure will balance the weight of the cable, the hook, and the weight of the above-said object. This is effected remotely by means of the pilot 104, or, more specifically, by closing the valve 71 in the shank of the hook 62, causing the air pressure in the pilot 104 to build up. As a result, valve means in the Norgren regulator, responding to said built up pressure, will return to its high pressure setting. This high pressure is regulated by means of an adjusting screw 103 which is a part of said regulator.

The balancing is due to the pressure of the diaphragm against the adjoining end of the nut 41, imparting to it a rotary force in the direction opposing the turn of the reel under the pull of the load. While this condition of balance exists, the object suspended from the hook may be easily pushed upwardly or floated at a desired height.

If more pressure were built up in the chamber 65 by means of the adjusting screw 103, said pressure would overcome the pull of the load so that the load would be raised automatically.

Once the object has been raised, it may be kept suspended in a floating position in which the load will be balanced by the pressure of the fluid medium so that the object may be easily maneuvered, shifted upwardly, or lowered with but little effort on the part of the operator.

After the object has been finally placed in a desired location, the pressure of the fluid medium, in this case air, may be lowered. This is effected remotely by means of the pilot 104, or more specifically by opening the valve 71 in the shank of the hook 62. A release of the air from the pilot through the hose 63 and said valve 71 will cause a shift of the respective valve means of the auxiliary chamber in the regulator so that the pressure in chamber 65 will be lowered to a point when it may be just sufficient to balance the weight of the cable and the hook alone.

It should be mentioned here that any build up of pressure in either the low or high pressure ranges beyond that desired as set by the above-named needle valve and by screw 103, respectively, will be relieved by a relieving feature which is a part of said Norgren regulator.

I wish to mention here that the regulator is a device now in use, for which reason no attempt was made here to describe it in detail beyond referring to such of its functions as are needed for the operation of the hoist.

It will be understood that some changes may be made in the structure of the hoist without departing beyond the range of the inventive concept disclosed herein.

What I, therefore, wish to claim is as follows:

1. A floating hoist comprising a housing partly open at one end, a screw disposed horizontally within the housing and secured at its end in the wall portions thereof against rotation about its axis, the screw including at one end a threadless shank, a nut mounted axially upon said screw, a reel axially mounted upon said nut for rotation therewith, a pressure chamber within the housing, the chamber including a solid diaphragm axially mounted upon the shank for a sliding longitudinal movement thereon, thrust bearing means between the diaphragm and one end of the nut in an operative association with both, sealing means between the diaphragm and the shank for a leak-proof contact therebetween, a length of a cable at one end anchored to the reel and coiled thereon, a load-supporting hook at the other end of said cable, the hook including a shank provided with a duct, a fluid pressure system in an operative connection with the chamber, the system including a controlling device for maintenance of pressure in the chamber to balance the pull of the grab and the load, a pilot forming a part of said controlling device to vary the pressure in the chamber, a flexible hose at one end operatively connected to said pilot and coiled upon the reel along the cable, the outer end of the hose being connected to the shank of the hook and opening into a duct therein, valve means adapted to open the duct to vary the pressure to the level sufficient to balance the weight of the grab alone.

2. A floating hoist as described in claim 1 but including, upon the horizontally-disposed screw, a nut which includes a plurality of balls fitting partly between the threads of said nut and partly between the threads of the screw, and externally-disposed tubular means to convey the balls from one end of the nut to the other end thereof.

3. A floating hoist including a housing, a screw secured at its ends within the housing against rotation, the screw including, at one end, a threadless shank, a freely-rotating nut engaging said screw, a reel mounted on the nut for rotation therewith, a length of a cable coiled upon one end part of the reel and having means at the opposite end for application to a load, a leak-proof chamber in the housing, the chamber being defined in part by a diaphragm axially mounted upon the shank in an airtight relation thereto for a longitudinal sliding movement thereon, the diaphragm bearing against one end of the screw, a fluid medium system associated with the housing, the system including a pressure-controlling device connected to a source of supply of said medium, for delivery thereof to the chamber to cause the diaphragm against the nut to impart a rotary movement to the reel, a pilot forming a part of said device, a flexible hose at one end attached to the pilot, the hose being adapted to be coiled upon the other end portion of the reel and being connected, at its other end, to the end of the cable, a valve in the hose at its outer end, and adjustable means within the pilot to divert air from the source of supply to the hose for release through the valve at the end thereof to lower the air pressure within the chamber.

4. A floating hoist in combination with a device to regulate pressure of a fluid medium in a chamber on said hoist, as described in claim 3 but including means in said device to adjust said pressure to a desired level and to keep it normally at said level.

5. A floating hoist including a housing, a screw secured within the housing against rotation, a freely-rotating nut engaging said screw, a reel mounted on the nut for rotation therewith, a length of a cable coiled upon one end part of the reel and having means at the opposite end for application to a load, a leak-proof chamber in the housing, the chamber being defined, in part, by a diaphragm bearing against one end of the screw, a fluid medium system associated with the housing, the system including a pressure-controlling device connected to a source of supply of said medium for delivery thereof to the chamber to cause the diaphragm against the nut to impart a rotary movement to the reel, a pilot forming a part of said device, a flexible hose at one end attached to the pilot, the hose being adapted to be coiled upon the other end portion of the reel and being connected, at its other end, to the end of the cable, a valve in the hose at its outer end, and adjustable means within the pilot to divert air from the source of supply to the hose for release through the valve at the end thereof to lower the air pressure within the chamber.

References Cited in the file of this patent

UNITED STATES PATENTS

| | | |
|---|---|---|
| 1,781,190 | Nilson et al. | Nov. 11, 1930 |
| 1,828,965 | Fuller et al. | Oct. 27, 1931 |
| 2,117,225 | Stein | May 10, 1938 |
| 2,276,990 | Long | Mar. 17, 1942 |
| 2,600,887 | Lannen | June 17, 1952 |
| 2,682,892 | Picard | July 6, 1954 |